INVENTOR.
ARTHUR T. SPEES

INVENTOR.
ARTHUR T. SPEES
BY

INVENTOR.
ARTHUR T. SPEES

INVENTOR.
ARTHUR T. SPEES

United States Patent Office 3,301,263
Patented Jan. 31, 1967

3,301,263
FILE CARD SYSTEM AND CARDS THEREFOR
Arthur T. Spees, 633 S. Carondelet,
Los Angeles, Calif. 90057
Filed Dec. 9, 1963, Ser. No. 328,798
8 Claims. (Cl. 129—16.7)

This invention has to do with filing card systems on the file cards thereof.

An object of the invention is to provide a new and improved filing card system in which the individual cards stand erect in evenly spaced relation in their container and in which the cards are flexible to provide easy access to any card. In this connection it is an object to provide a card filing system in which a plurality of the cards can be flexed laterally in a group to expose to view the face of a desired single card in the file and to permit its removal.

Another object is to provide a filing card system in which the individual cards are resiliently flexible and are so made that when a group of the cards filling a container are flexed and compressed together to expose a single card to view or for removal, the group of cards so flexed becomes spring loaded and, when released, spring back to erect, evenly spaced relation in the container.

A still further object is to provide a filing card system in which the cards are so spaced that portions of the front face adjacent the upper edge thereof are visible and thus a card can be identified by suitable indicia thereon. In this connection it is an object to provide a system wherein the cards are evenly spaced in a manner to allow the use of lines or other indicia printed on the front face of the cards adjacent the top edge to be clearly visible across the top of the group of cards, thereby permitting the cards to be related visually to information or schedules shown at the back of the file.

Another object is to provide a filing card system in which the cards are inherently so formed as to provide for the self-spacing thereof whereby the cards can accommodate tabs attached to their upper edge portions without the tabs touching the adjacent cards either when the cards are in the file or when being removed from or inserted in the file.

A further object is to provide a card system wherein the construction of the cards is such as to result in minimum surface friction between cards when a card is inserted or removed from the group and which prevents any smudging of written or typed information on the face of the cards.

Another object is to provide a filing card system in which the cards are so constructed that an individual card may be releasably locked or supported in a raised position by means of interlocking engagement with adjacent cards. A further object is to provide a card system in which the individual cards are enabled to be placed in slight tension by filling the container with sufficient cards to slightly compress the group of cards from end to end whereby individual cards may be partially raised and will stay in such position.

Another object is to provide novel file cards embodying the means for achieving the aforementioned objects.

These and other objects will be apparent from the drawings and the following description. Referring to the drawings.

Figures 1, 2:
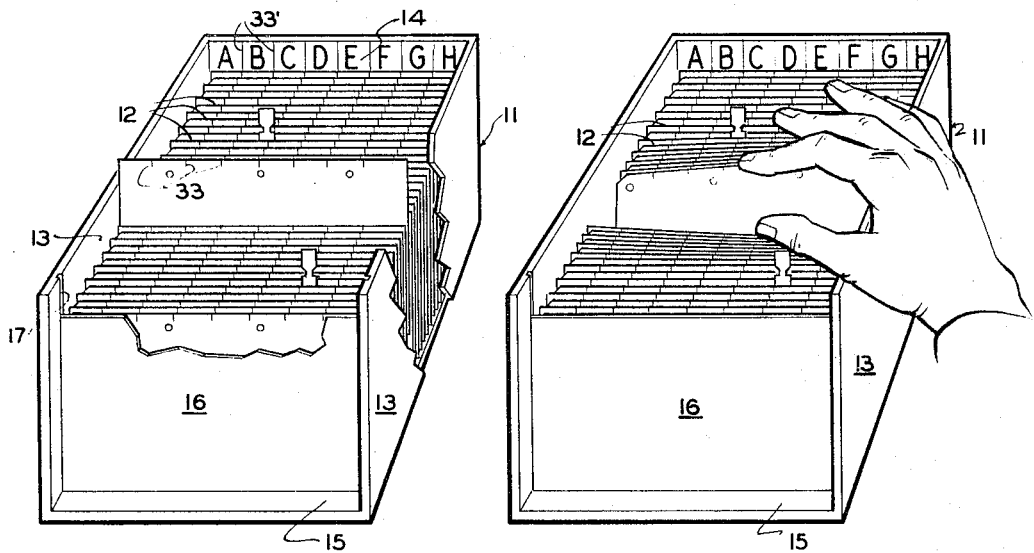
FIG. 1 is a perspective view partially broken away showing a container with file cards therein embodying the invention.
FIG. 2 is a view similar to FIG. 1 but showing the file cards being flexed to expose the face of one card to view.

More particularly describing the invention, referring first to FIGS. 1 to 9, numeral 11 generally designates a container or receptacle of box-like form for holding a plurality of file cards 12. The container is shown as having side walls 13, a rear wall 14, a bottom wall 15 and a removable front wall 16 which fits in grooves 17 in the side walls. A cover may be provided if desired.

Figure 6:
FIG. 6 is a sectional view similar to FIG. 5 but with the group of cards shown in laterally compressed condition.

The individual file cards 12 are so designed as to stand upright in laterally spaced relation when in a group of sufficient cards to fill the container, and so designed that a group or plurality of the cards are resiliently flexible and may be compressed as shown in FIGS. 2 and 6 for the purpose of giving ready access to any given card in the group. As will later appear, the individual cards are placed in tension when a group is so compressed.

The cards themselves are each formed of a body 20 of sheet material and, while this may be paper, I prefer to form the cards of a more durable material and one having greater springiness than the conventional paper card stock. By way of example, I have found that a plastics, such as rigid polyvinyl chloride sheet material, is particularly sutiable. The body should be readily flexible and springy so that when flexed and released it springs back to its original planar shape and has no tendency to warp or take a set. At least the front surface of the cards should be provided with a finish or texture suitable for writing and typing thereon.

To accomplish the spacing of the cards in the group, the body of each card is embossed or otherwise formed so as to provide a plurality of small projections or protuberances 21 on at least one face thereof. While, for the purpose of illustration I only show seven such protuberances, I contemplate that in actual practice a greater number would be provided. In this connection, throughout the drawings the thickness of the cards and the size of the projections have been exaggerated to facilitate illustration. By way of example, the thickness of a card may be of the order of .010" while the height, or extent laterally of the card body, of the protuberances may be anywhere from twice the thickness of the card to four or five times that thickness, and I have found that for a card having a thickness of .010", a protuberance height of .035" is very satisfactory.

Figures 3, 4:
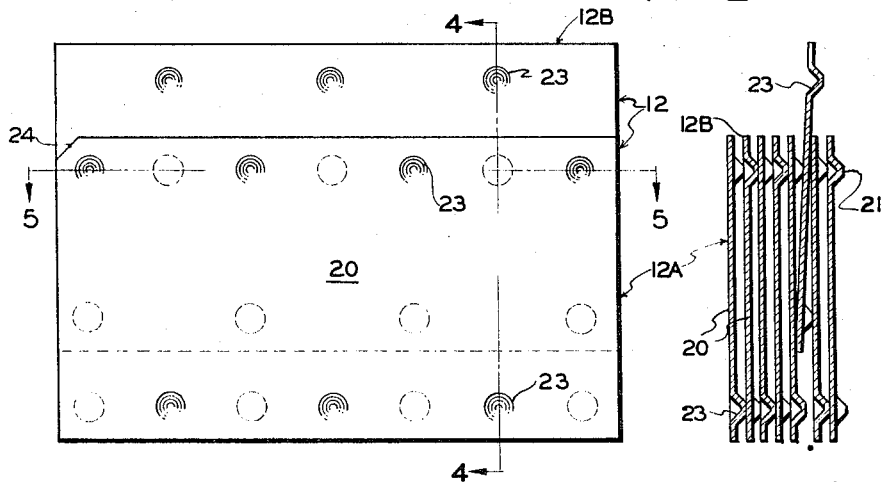
FIG. 3 is a front elevational view of a group of file cards with one card partially raised, the view being on a larger scale than FIGS. 1 and 2.
FIG. 4 is a sectional view on line 4—4 of FIG. 3.

I prefer to arrange the protuberances 21 across the card in a manner to offer only minimum interference with the normal use of the card for writing thereon. Thus I show the protuberances in two rows, one adjacent the upper edge of the card and the other adjacent the lower edge thereof, as best shown in FIG. 3, thereby leaving a substantial area of the card body uninterrupted so that it can be written or typed upon. The protuberances themselves in the form of the invention illustrated are formed from the body of the card by embossing or the like and thus a dimple 23 is formed on the front face of each card coincident with the protuberances on the rear face thereof. The cards may be said to have dimpled projections, or dimpled protuberances.

Adjacent cards in the file are provided with protuberances or embossed patterns which do not register. Thus, referring to FIG. 3, it will be seen that on the foremost card, designated 12A, the embossed pattern is such that the protuberances are disposed intermediate those of the next adjacent card, designated 12B. It is only necessary to have two patterns and to arrange the cards alternately in the file to accomplish this, and the individual cards can readily be identified by a suitable marking or difference in shape, as by removing a corner portion to provide a diagonal edge 24 at one corner, as shown on the cards 12A.

Figure 5:
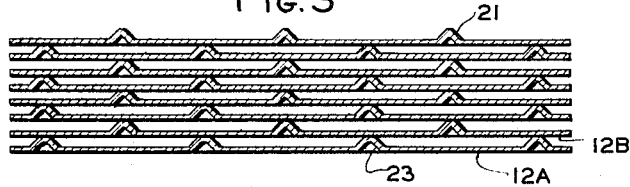
FIG. 5 is a sectional view on line 5—5 of FIG. 3, but with the raised card shown at the same level as the other cards.

Preferably the embossed pattern is such that the protuberances of one card are disposed midway between the protuberances of the cards adjacent thereto as is apparent in the drawings. With this arrangement it is possible to achieve maximum compression of a group of the cards as shown in FIG. 6, and when this is done the portions of each card body between the individual protuberances are bent in tension to form arches 26 over the protuberances of the next adjacent card and the entire group of compressed cards thus becomes spring loaded. Consequently, when the compressing force is released, the cards spring back to their original position as shown in FIGS. 1 and 5. It will be apparent that the size, position and spacing of the protuberances are factors upon which the tension of the individual cards will depend when a group of cards is compressed.

Figure 7:
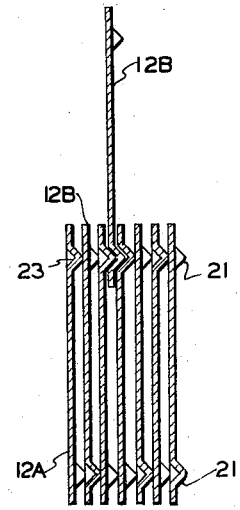
FIG. 7 is a view similar to FIG. 4 but showing one card in raised and locked position.

Another feature of the invention is that the embossed pattern of the cards can be made such that the embossed pattern at the lower edge of one card will coincide or register with the embossed patterns of the upper portions of the adjacent cards, and thus a single card may be raised as shown in FIG. 7 and releasably locked in elevated position by the interengagement of the embossed patterns.

Figure 8:
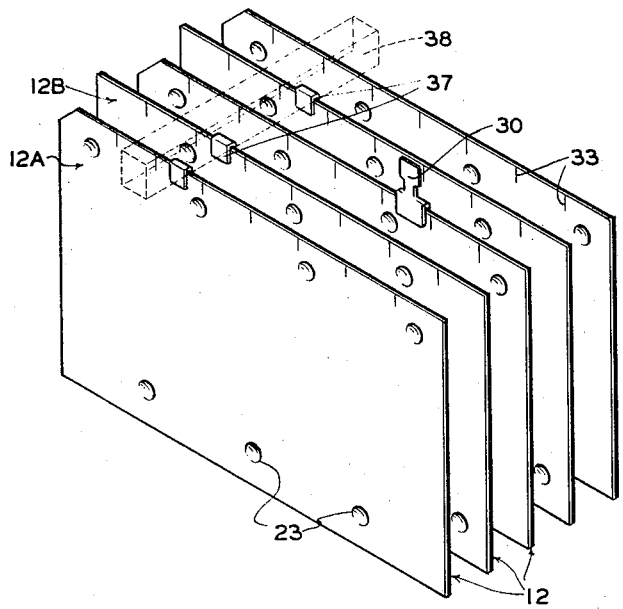
FIG. 8 is an isometric view of a group of the cards heretofore shown, some of which are provided with tabs or markers.
Figure 9:
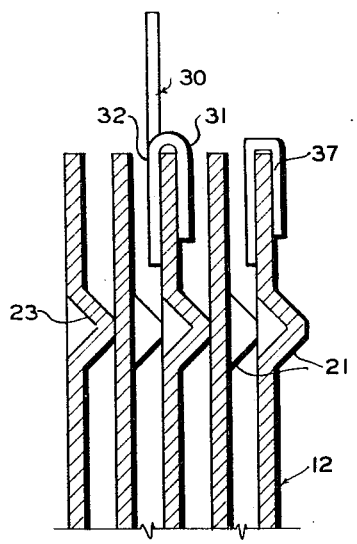
FIG. 9 is an enlarged fragmentary sectional view of the upper end portions of a group of the cards heretofore shown.

While, as previously indicated, the height of the protuberances may be varied considerably to accomplish given results, it is desirable for some uses to space the cards apart sufficiently to enable the application of tabs 30, such as best shown in FIGS. 8 and 9 without having the tabs touch adjacent cards. It will be apparent that there is ample room between cards to receive the legs 31 and 32 of the tab without touching the adjacent cards and thus the cards can be inserted and removed without accidental removal of the tabs.

It will be noted from FIG. 1 that, by reason of the spacing of the cards, the front surface of each card adjacent to its upper edge is visible and consequently this area may be provided with indicia, such as vertical, laterally spaced lines 33, between one or more of which a key marking or tab 30 can be placed to classify the subject matter of a particular card. Also, the lines 33 can be correlated with similar lines 33' provided on the back wall (or front wall) of the container between which classification indicia can be placed, such as the letters A, B, C, etc. shown. If desired, as shown in FIG. 9, metal clips 37 of a magnetic material, such as steel, can be fixed to the cards in a manner to classify the cards. When these are employed, a bar magnet 38 can be used to remove or partially remove all cards from the file as have such clips in alignment from front to rear of the group of cards, the cards being readily withdrawable because of the low friction between cards.

Figure 10:
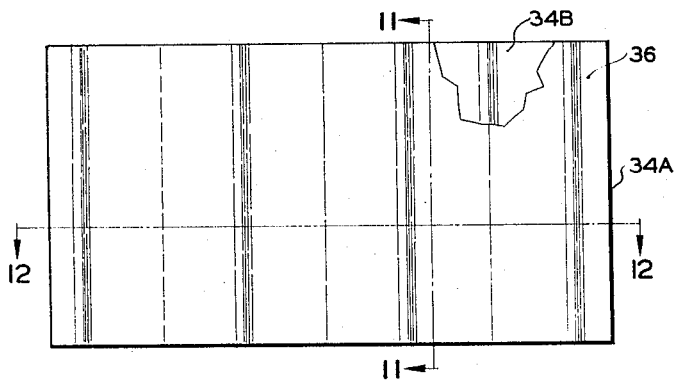
FIG. 10 is a front elevational view of a group of cards showing an alternate form of the invention.
Figure 11:
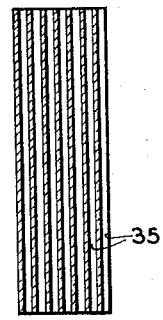
FIG. 11 is a sectional view on line 11—11 of FIG. 10.
Figure 12:
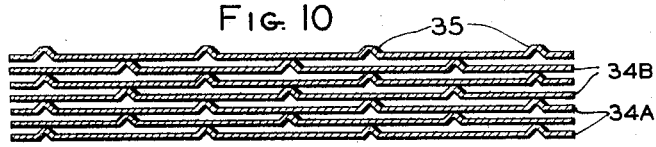
FIG. 12 is a sectional view on line 12—12 of FIG. 10.

In the construction thus far described I have shown an embossed pattern of what may be termed dimpled protuberances or projections, however I contemplate that any means which will provide small protuberances on the surface of a card may be used and it is not essential that the card be embossed. Also, other patterns of means for spacing the cards laterally may be used, and by way of example, in FIGS. 10, 11 and 12, I show cards 34A and 34B formed to provide ribs or ridges 35 disposed vertically across the rear face 36 of the cards. In this case the ribs of alternate cards in the file are disposed to be out of registration with each other, as shown, so as to insure the proper spacing and flexibility of the group of cards. It will be apparent that with the construction described the cards can be compressed together as a group in the manner previously described, the portions of each card between the ribs thereof flexing over and partially around the ribs of the next adjacent card.

Figure 13:
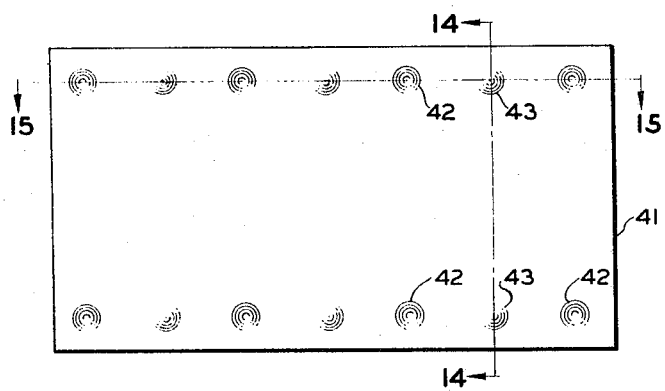
FIG. 13 is a view similar to FIG. 10, but showing another form of the invention.
Figure 14:
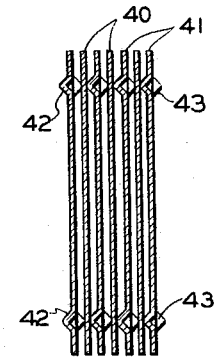
FIG. 14 is a sectional view on line 14—14 of FIG. 13.
Figure 15:
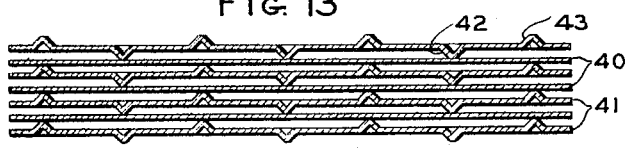
FIG. 15 is a sectional view on line 15—15 of FIG. 13.

In FIGS. 13, 14 and 15, I show another form of the invention wherein a file card system is employed which includes plain or flat-surfaced cards 40 sandwiched between cards 41 which are embossed or otherwise formed to provide protuberances 42 on one face thereof and protuberances 43 on the other face thereof. The plain cards 40 should also be of a material possessing flexible springiness so as to impart the same qualities to this arrangement as attributed to the arrangement previously described.

Figure 16:
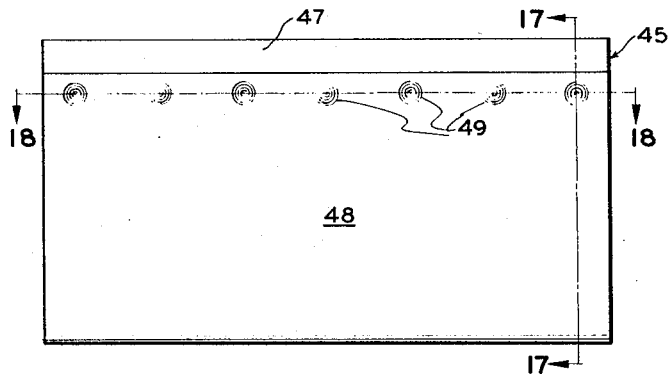
FIG. 16 is a view similar to FIG. 10, but showing an alternate construction.
Figure 17:
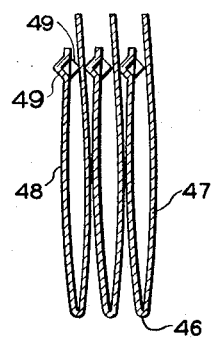
FIG. 17 is a sectional view on line 17—17 of FIG. 16.
Figure 18:
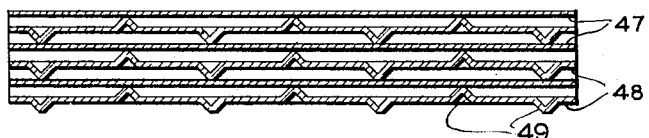
FIG. 18 is a sectional view on line 18—18 of FIG. 16.

Referring now to FIGS. 16, 17 and 18, I show an alternate form of the invention wherein the individual cards in the file are formed of a body 45 of sheet material folded or bent upon itself at 46 to provide a back sheet 47 and a front sheet 48. The latter is preferably narrower in width than the back sheet and is provided adjacent its upper edge with means for spacing the same from its own back sheet and the back sheet of the next adjacent card in the file. This means has been shown as an embossed dimpled pattern in which protuberances 49 are provided on each face of the front sheet of the card, the protuberances on the front face alternating with those on the back face. This construction spaces the upper edge portions of a group of such cards as shown in FIG. 17 while the natural springiness of the folded cards serves to separate them therebelow. Preferably the upper edges of the front sheet 48 terminate below the upper edges of the back sheets, as shown, but this is not essential.

Figure 19:
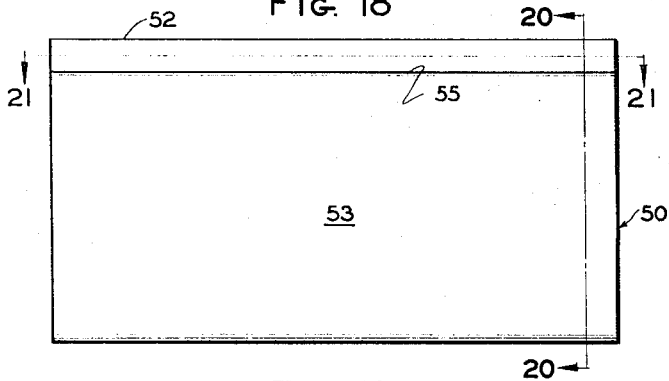
FIG. 19 is a view similar to FIG. 10 of still another form of the invention.
Figure 20:
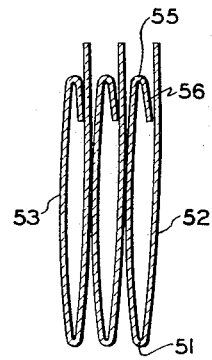
FIG. 20 is a sectional view on line 20—20 of FIG. 19.
Figure 21:
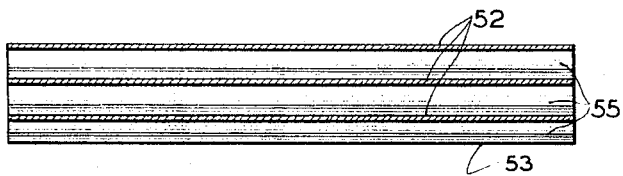
FIG. 21 is a sectional view on line 21—21 of FIG. 19.

A somewhat simpler form of the invention especially suitable for paper or materials which would not successfully retain an embossed pattern of protuberances is shown in FIGS. 19, 20 and 21. Here the individual cards are each formed of a body 50 of sheet material which is bent upon itself at 51 to form the back and front sheets 52 and 53, respectively. In order to space the cards apart in the file and produce a compressible group of cards, the front sheets are bent upon themselves at their upper margins at 55 below the upper edges of the back sheets 52 to provide a terminal or spacing portion 56 of limited width. In this construction, the natural bow of the cards is relied upon to a great extent to insure spacing.

Although I have shown and described preferred forms of my invention, I contemplate that various changes and modifications can be made therein without departing from the invention, the scope of which is indicated by the following claims.

I claim:

1. A file card adapted for use with similar cards in a filing receptacle providing means for holding a group of file cards upright and in alignment one behind the other, comprising a body of springy sheet material folded once upon itself to form a back sheet and a front sheet having free edges opposite the fold, said edges constituting the upper edges, said front sheet being formed to provide rearwardly projecting protuberances adjacent its upper edge and extending toward said back sheet and serving to space said sheets and being formed to provide forwardly projecting protuberances adjacent its upper edge serving to space said front sheet from the rear sheet of an adjacent file card in the filing receptacle, said forwardly and rearwardly projecting protuberances being evenly spaced across the sheet with the forwardly projecting protuberances being positioned substantially midway of the rearwardly projecting protuberances whereby a group of cards can be manually compressed in a direction normal to their planes with the individual cards flexing under tension.

2. The file card set forth in claim 1 in which said front sheet terminates short of the upper edge of said back sheet whereby an upper marginal portion of the back sheet is exposed to view.

3. A file card adapted for use with similar cards in a filing receptacle providing means for holding a group of file cards upright and in alignment one behind the other, comprising a body of springy sheet material folded once upon itself to form a back sheet and a front sheet having free edges opposite the fold, said edges constituting the upper edges, one of said sheets being formed to provide inward protuberances adjacent its upper edge and extending toward the other sheet and serving to space said sheets and being formed to provide outward protuberances adjacent its upper edge extending oppositely to said inward protuberances and serving to space said sheet from the next adjacent file card in the filing receptacle, said protuberances being evenly spaced across the sheet with the inward protuberances being positioned midway of the outward protuberances whereby a group of cards can be manually compressed in a direction normal to their planes with the individual cards flexing under tension.

4. The file card set forth in claim 3 in which the body of sheet material of the card is of springy plastic sheet stock.

5. The file card set forth in claim 3 in which the protuberances have a height within the range of from 2 to 5 times the thickness of the sheet material of the card.

6. A file card system, comprising a file card receptable providing means for holding a group of file cards disposed upright and in alignment one behind the other, and a plurality of file cards in said receptacle, said cards each having a body of springy sheet material folded once upon itself to form a back sheet and a front sheet having free edges opposite the fold, said edges constituting the upper edges, said front sheet having means adjacent its upper margin in the form of rearwardly extending protuberances spacing said front sheet from said back sheet and having means adjacent its upper margin in the form of forwardly extending protuberances spacing said front sheet from the back sheet of the next adjacent card in the file card receptacle, said forwardly and rearwardly extending protuberances being evenly spaced across the sheet with the forwardly extending protuberances being positioned substantially midway between the rearwardly extending protuberances whereby a group of cards can be manually compressed in a direction normal to their planes with the individual cards flexing under tension.

7. The file card system set forth in claim 6 in which the front sheet of each card terminates short of the upper edge of the back sheet whereby an upper marginal portion of the back sheet is exposed to view.

8. A file card system, comprising a file card receptacle providing means for holding a group of file cards disposed upright and in alignment one behind the other, and a plurality of file cards in said receptacle, said cards each having a body of springy sheet material folded once upon itself to form a back sheet and a front sheet having free edges opposite the fold, said edges constituting the upper edges, one of said sheets being formed to provide inward protuberances adjacent its upper edge facing the other sheet and serving to space the sheets and having outward protuberances adjacent it upper edge facing oppositely to said inward protuberances and serving to space said sheet from the next adjacent card in the file card receptacle, said protuberances being evenly spaced across the sheet with the inward extending protuberances being midway between the outward protuberances whereby a group of cards can be manually compressed in a direction normal to their planes with the individual cards flexing into a condition of tension.

References Cited by the Examiner

UNITED STATES PATENTS

| | | | |
|---|---|---|---|
| 747,761 | 12/1903 | Pollard | 129—16.5 |
| 834,294 | 10/1906 | Gremple | 129—16.7 |
| 928,346 | 7/1909 | Vick | 129—16.7 |
| 1,073,248 | 9/1913 | Kouba | 129—16.5 |
| 1,560,058 | 11/1925 | Jamieson | 129—16.5 |
| 1,835,678 | 12/1931 | Strassel | 129—16.7 |
| 1,931,224 | 10/1933 | Herz | 129—16.5 |
| 2,284,586 | 5/1942 | McDermott | 129—16 |
| 2,291,724 | 8/1942 | Jonas | 129—16.7 |
| 2,329,201 | 9/1943 | Jonas | 129—16 |
| 2,371,713 | 3/1945 | Short | 129—16.7 |
| 2,586,381 | 2/1952 | Quinn | 129—16.7 |
| 2,634,449 | 3/1953 | Lowings | 129—16.7 |

FOREIGN PATENTS

| | | |
|---|---|---|
| 1,241,355 | 11/1959 | France. |
| 659,198 | 10/1951 | Great Britain. |
| 790,095 | 3/1958 | Great Britain. |
| 143,578 | 1/1954 | Sweden. |

JEROME SCHNALL, *Primary Examiner.*